United States Patent Office 3,676,200
Patented July 11, 1972

3,676,200
PROCESS FOR THE MANUFACTURE OF PREPREGS
Heinz Rembold, Arlesheim, and Ewald Losert, Birsfelden, Switzerland, assignors to Ciba-Geigy AG, Basel, Switzerland
No Drawing. Filed July 2, 1970, Ser. No. 52,106
Claims priority, application Switzerland, July 7, 1969, 10,354/69
Int. Cl. C08g 30/14; C03c 25/02
U.S. Cl. 117—121
11 Claims

ABSTRACT OF THE DISCLOSURE

Process for the manufacture of prepregs from pre-impregnated endless filaments, hanks, rovings, mats, knitted fabrics or woven fabrics based on inorganic fibre materials of high mechanical performance, or highly heat-resistant organic fibres, by impregnating the substrate with a solution containing (a) a curable polyadduct, still containing free glycidyl groups, of triglycidylisocyanurate and a less than equivalent amount of curing agent, which is obtained by reacting triglycidylisocyanurate with cycloaliphatic, aromatic or heterocyclic polyamines which contain at least two primary amino groups, at elevated temperature, with 0.05 to 0.5 amine hydrogen equivalent of the polyamine being employed per 1 epoxide equivalent of the triglycidylisocyanurate, (b) a curing agent in an amount sufficient for complete curing of the polyadduct (a) and (c) an organic solvent, and by subsequently drying the impregnated substrates.

---

It is known that triglycidylisocyanurate (TGIC) when reacted with known curing agents for epoxide resins and cured yields moulded materials having excellent properties. As a result of the trifunctionality of this epoxide compound, the cured moulded materials have a high density of cross-linking, which, particularly in conjunction with carboxylic acid anhydrides and aromatic polyamines as curing agents, results in a high heat distortion point, high modulus of elasticity as well as first-class mechanical and electrical properties at elevated temperature. The structure of the heterocyclic ring of the TGIC furthermore results in the cured moulded materials having high tracking and arcing resistance.

Both the high modulus of elasticity and also the constancy of the mechanical and electrical properties over a wide temperature range make it appear interesting to process triglycidylisocyanurate in combination with reinforcing agents, especially with glass fibres and carbon fibres. Because of the crystalline consistency of the product, (melting point about 100° C.) as well as because of its relatively poor solubility in the customary organic solvents, extraordinary processing difficulties are encountered when coating rovings, mats or fabrics of glass fibres. Thus pure triglycidylisocyanurate, for example in the form of a hot melt, with carboxylic acid anhydrides or aromatic polyamines can only be processed on glass fibres in a troublesome fashion. If however the process is carried out in solution, only few solvents, such as for example dimethylformamide or ethylene glycol monomethyl ether in very large excess, can be used. The solutions are as a rule not stable and because of the triglycidylisocyanurate crystallising out again present the greatest difficulties on further processing.

When applied to the coated webs or hanks, the triglycidylisocyanurate in each case soon crystallises out again and drops off the carrier again on the slightest mechanical stress. For these reasons it is practically impossible to manufacture, say, prepregs or coated webs with pure triglycidylisocyanurate. The possibility of mixing or co-reacting with other polyepoxide compounds in most cases only worsens the good properties of the triglycidylisocyanurate but hardly prevents the objectionable recrystallisation.

A process has now been found which makes it possible to manufacture glass fibre laminates, or laminates based on other high temperature-resistant fibres, by the prepreg or hot pressing process using triglycidylisocyanurate, wherein the good properties of the TGIC are retained and crystallisation on the coated webs is at the same time prevented. Herein the pure, crystalline triglycidylisocyanurate, which has pre-reacted with a less than equivalent amount of a suitable curing agent at elevated temperature, is employed, so that on the one hand a tendency of the resulting melt to crystallise no longer exists and on the other hand adequate solubility or fusibility of the resulting resin is still achieved. Cycloaliphatic and above all aromatic and heterocyclic diamines or polyamines here proved to be suitable for the pre-reaction with the triglycidylisocyanurate.

The invention therefore relates to use of ready-to-use impregnating and dipping solutions which contain a polyadduct containing epoxide groups and also a curing agent for epoxide resins, for the manufacture of prepregs.

The subject of the present invention is thus a process for the manufacture of prepregs from pre-impregnated endless filaments, hanks, rovings, mats knitted fabrics or woven fabrics based on inorganic fibre materials of high mechanical performance, such as especially glass fibres, boron fibres or carbon fibres, or of highly heat-resistant organic fibres, such as especially polyimide fibres, characterised in that the substrate is impregnated with a solution containing (a) a curable polyadduct, still containing free glycidyl groups, of triglycidylisocyanurate and a less than equivalent amount of curing agent, which is obtained by reacting triglycidylisocyanurate with cycloaliphatic, aromatic or heterocyclic polyamines which contain at least two primary amino groups, at elevated temperature, with 0.05 to 0.5 amine hydrogen equivalent of the polyamine being employed per 1 epoxide equivalent of the triglycidylisocyanurate, (b) a curing agent in an amount sufficient for complete curing of the polyadduct (a) and (c) an organic solvent, and that the impregnated substrates are subsequently dried.

In the manufacture of the polyadduct, the ratio of triglycidylisocyanurate to amine curing agent is so chosen that 0.05–0.5 amine hydrogen equivalent is reacted per 1 epoxide equivalent. The aromatic, cycloaliphatic and heterocyclic diamines and polyamines used should contain at least two primary amino groups.

The pre-reaction is carried out using suitable solvents or directly in the melt using an elevated temperature. The pre-reaction is appropriately carried out at temperatures of 70–220° C., but preferably at 100–150° C.

Suitable cycloaliphatic di-primary diamines and polyamines for the manufacture of the polyadducts are, for example, 1,8-diamino-p-methane,
3-aminomethyl-3,5,5-trimethyl-1-cyclohexylamine
  (=isophoronediamine),
bis(4-amino-cyclohexyl)methane,
bis(4-amino-3-methyl-cyclohexyl)methane,
2,2-bis(4-amino-cyclohexyl)propane,
1,2-, 1,3- and 1,4-diaminocyclohexane,
1,3-diaminocyclopentane,
1-amino-2-aminomethylcyclopentane,
1-amino-3-aminomethylcyclopentane and
dodecahydrobenzidine.

Preferably, aromatic di-primary polyamines or heterocyclic di-primary polyamines are used for the manufacture of the polyadducts.

As suitable aromatic polyamines there may for example be mentioned:

ortho-, meta- and para-phenylenediamine,
4,4'-diaminodiphenyl-ketone,
4,4'-diaminodiphenyl-oxide,
4,4'-diaminodiphenyl-sulphide,
4,4'-diamino-3,3'-dimethoxydiphenylmethane,
2,2-bis(p-aminophenyl)propane and above all 4,4'-diaminodiphenylsulphone and 4,4'-diaminodiphenylmethane (=bis[p-aminophenyl]methane).

Possible heterocyclic di-primary polyamines are above all compounds in which two ω-aminoalkyl radicals, preferably γ-aminopropyl radicals, are bonded to the two endocyclic nitrogen atoms of a hydantoin or dihydrouracil nucleus, such as for example 1,3-di(γ-aminopropyl)-5,5-dimethylhydantoin, 1,3-di(γ-aminopropyl)-5,5-dimethyl-5,6-dihydrouracil or 1,3-di(γ-aminopropyl)-6-methyl-5,6-dihydrouracil; also, compounds in which two hydantoin or dihydrouracil nuclei are linked to one another by one of their endocyclic nitrogen atoms via a bridge member, and in which a ω-aminoalkyl radical, preferably a γ-aminopropyl radical, is bonded to each of the other endocyclic nitrogen atoms in each of the two nuclei, such as for example 1,1'-methylene-bis (3-γ-aminopropyl)-5,5-dimethylhydantoin, 1,6-bis(1'-[γ-aminopropyl]-5',5'-dimethylhydantoinyl-3')-hexane or β,β'-bis-(1-[γ-aminopropyl]-5,5-dimethylhydantoinyl-3)-diethyl ether.

To manufacture read-to-use steeping and impregnating resins the solutions—where the manufacture of the polyadducts was carried out in the presence of organic solvents—of the polyadducts are mixed with a curing agent suitable for the cure. The curing agent of which a less than equivalent amount was used for the manufacture of the polyadduct which still contains free glycidyl groups, and the curing agent added to the impregnating resin solution for the complete curing, can be identical or different. Preferably, an aromatic polyamine, such as 4,4'-diaminodiphenyl-sulphone or 4,4'-diamino-diphenyl-methane, or a heterocyclic, di-primary polyamine, such as 1,3-di(γ-aminopropyl)-5,5-dimethylhydantoin, is again used. It is however also possible to use other known curing agents for epoxide resins, for example polycarboxylic anhydrides, such as for example tetrahydrophthalic anhydride or hexahydrophthalic anhydride, or above all also Lewis acids, for example Friedel-Crafts catalysts, and especially addition compounds of boron trifluoride and phenols, amines or amides, such as BF$_3$-monoethylamine complex, BF$_3$-piperidine complex, BF$_3$-pyridine complex or BF$_3$-dimethylformamide complex.

An addition of a mixture of an aromatic polyamine, such as 4,4'-diaminodiphenyl-methane and a boron trifluoride-amine complex, such as boron trifluoride-monoethylamine complex, has proved particularly suitable for the complete curing.

If the polyadducts have been manufactured by the melt process, the product is appropriately dissolved by means of a suitable organic solvent, such as ketones, alcohols, esters, dimethylsulphoxide and above all ethylene glycol monomethyl ether and/or dimethylformamide, before mixing with the curing agent.

The solutions manufactured in this way, which contain polyadducts containing epoxide groups as well as curing agents for epoxide resins, are now used for the dipping impregnation of rovings, hanks or fabrics, and these are subsequently dried in a drying tunnel or oven. In the course thereof, the solvents are evaporated and webs or pre-pregs pre-impregnated with resin are produced, which can be processed into laminates in accordance with the hot pressing process. Both the impregnating solutions and the coated pre-impregnated webs can be stored for a prolonged period without the triglycidylisocyanurate crystallising out.

Suitable materials for impregnating are above all rovings, hanks, mats or fabrics of inorganic fibre materials of high mechanical performance, such as glass fibres, quartz fibres, silicon carbide fibres, silicon nitride fibres, beryllium fibres, beryllium oxide fibres, boron fibres, boron carbide fibres, zirconium oxide fibres, aluminium oxide single crystal fibres and above all carbon fibres.

Suitable fibre materials for the substrates to be inmpregnated are furthermore also highly temperature-resistant organic fibres, such as for example polyimide fibres.

The substrates pre-impregnated in this way can, in a manner which is in itself known, serve for the manufacture of laminated structural parts, such as for example bodywork parts of motor vehicles and aircraft, bodies of boats and ships, pressure vessels, propellers for aircraft, ships and gliders, rotors of helicopters, structural elements for radar antennae and space satellites, machine bearings, tools, fibre-reinforced plastics pipelines, surgical appliances as well as sports articles, such as fibre poles, skis, fishing rods and oars.

The laminated structural parts can be manufactured according to the hand-lay-up process which even today is still frequently used. However, other possibilities for the manufacture of the structural parts also exist, such as manufacture with the aid of a pressure sack or vacuum sack and above all working with press moulds and platen presses. The more recent method, the so-called filament winding process, is also suitable for the manufacture of the laminated materials, especially for the construction of high pressure vessels as well as for the field of aviation, rocket-building technology and space flight.

In the examples which follow, parts denote parts by weight and percentages denote percentages by weight.

EXAMPLE 1

350 parts of crystalline triglycidylisocyanurate having an epoxide content of 9.2 epoxide equivalents per 1000 g. are fused at 130° C. and 35 parts of 4,4'-diaminodiphenylsulphone are then added in portions. Thereafter the batch is heated to 150° C., whereby a clear melt, coloured yellow-brown, is produced. Because of the slight exothermic nature of the reaction the temperature rises by a few degrees. The reaction mixture is kept at 150–155° C. for 90 minutes whilst stirring and is then cooled to about 130° C., and 95 parts of ethylene glycol monomethyl ether are then added.

After cooling to room temperature, a clear, yellow-brown solution results, which only tends to slight crystallisation after about 2 days. This crystallisation can be prevented by the addition of 20 parts of dimethylformamide (=resin solution A).

The undiluted reaction mixture yields a stable, clear and non-crystallising solid resin with a softening point (Kofler) of 50–55° C.

The resulting resin can be processed into glass laminates by the prepreg process in the following manner:

500 parts of the resin solution A, manufactured in accordance with the process described above and diluted with ethylene glycol monomethyl ether and dimethylformamide, are mixed with a solution of 175 parts of 4,4'-diaminodiphenylsulphone and 3.5 parts of boron trifluoride-monoethylamine complex in 250 parts of ethylene glycol monomethyl ether, whereby an impregnating solution with a viscosity of about 150 cp./25° C. is produced.

A glass fabric having a weight per unit area of 290 g./m.$^2$, with Atlas binding and finished with chromium methacrylate complex finish Volan A (registered trade name) was coated with this solution by dip impregnation and subsequent drying for 10 minutes at 130° C. in a stream of hot air. A prepreg which is dry and flexible at room temperature results. Several layers thereof, stacked to give a press bundle and covered on both sides with a polyvinyl fluoride release film (registered trade name Tedlar of Messrs. Du Pont) can be pressed, using pressure and heat, to give a tough, high performance laminate, in the following manner:

After introduction into the press, which is heated to 170° C., and after a contact time of 3 minutes 50 seconds, the press pressure is increased to 20 kp./cm.² and the material pressed for 1 hour. After 2 hours' post-cure at 180° C., the resulting laminate possesses the following properties:

Resin content=38–39%
Flexural strength VSM 77,103 at room temperature=46.72 kp./mm.²
Impact strength, VSM 77,105=129.21 cm. kp./cm.²
E-modulus (static)=4156 kp./mm.²

EXAMPLE 2

700 parts of crystalline triglycidylisocyanurate with an epoxide content of 9.2 epoxide equivalents/kg. are fused at 120° C. After cooling to about 110° C., 52.5 parts of 4,4'-diaminodiphenylmethane are added in small portions, with vigorous stirring. The addition is complete after about 15 minutes. The reaction mixture is thereafter kept for a further 20 minutes at 115 to 120° C. and is then diluted with 250 g. of ethylene glycol monomethyl ether and cooled to room temperature.

A yellowish solution results, which only tends towards slight crystallisation after some days (=resin solution B). The undiluted reaction mixture yields a clear, slightly yellow-coloured, non-crystalline solid resin of softening point (Kofler) of 60 to 62° C.

800 parts of the resin solution B, manufactured according to the process described above and diluted with ethylene glycol monomethyl ether, are mixed with a solution of 240 parts of 4,4'-diaminodiphenyl-sulphone and 6 parts of boron trifluoride-monoethylamine complex in 440 parts of ethylene glycol monomethyl ether, whereby an impregnating solution of about 150 cp./25° C. is produced.

Prepregs are manufactured by dip impregnation and drying for 10 to 11 minutes at 120° C. as described in Example 1. These prepregs are dry and flexible. The pressing to give laminates can be carried out analogously to that in Example 1. Herein, the press bundles are again introduced into the press which is heated to 170° C. and, following a contact time of 60 to 80 seconds, are pressed for one hour at 20 kp./cm.².

A tough laminate is produced, which after 4 hours' post-cure at 180° C. shows the following properties:

Resin content=40%
Flexural strength (room temperature) VSM
  77.103=57.49 kp./mm.²
  At 150° C.=55.32 kp./mm.²
  After 1 hour's storage in boiling water=49.68 kp./mm.²
Water absorption after:
  1 day; 20° C.=0.41%
  1 hour; 100° C.=1.07%
Impact strength VSM 77,105=129.7 cm. kg./cm.²
tg δ at various temperatures (measured with the Schering bridge; 1000 v./50 Hz.) at:
  25° C.=0.008
  60° C.=0.008
  80°=0.009
  100° C.=0.013
  120° C.=0.025
  140° C.=0.062

EXAMPLE 3

1000 parts of crystalline triglycidylisocyanurate with an epoxide content of 9.2 epoxide equivalents/kg. are mixed with 350 parts of acetone and 137 parts of 4,4'-diamino-3,3'-dimethyldicyclohexylmethane, dissolved in 75 parts of acetone, are added dropwise with vigorous stirring.

After completion of the addition, the acetone is distilled off and the residual clear melt is further kept for 60 minutes at 115° C. to 120° C. The reaction mixture is thereafter diluted with 240 parts of ethylene glycol monomethyl ether and cooled to room temperature.

A solution results which only tends to slight crystallisation after some days (=resin solution C). The undiluted reaction mixture yields a clear, light yellow-coloured, non-crystalline solid resin which does not crystallise even after prolonged storage. 120 parts of the resin solution C manufactured according to the process described above and diluted with ethylene glycol monomethyl ether are mixed with a solution of 35 parts of 4,4'-diaminodiphenyl-sulphone and 0.3 parts of boron trifluoroidemonoethylamine complex in 115 parts of ethylene glycol monomethyl ether, whereby an impregnating solution of about 150 cp./25° C. is produced.

Prepregs are manufactured by dip impregnation and drying for 6 to 7 minutes at 150° C., as described in Example 1.

The pressing to give laminates can be carried out as described in Example 1. Herein, the press bundles are introduced into the press heated to 160° C. and, following a contact time of 100–150 seconds, are pressed for one hour at 20 kp./cm.².

A tough laminate is produced, which after 5 hours' post-cure at 160° C. shows the following properties:

Resin content=35–40%

Flexural strength according to VSM 77,103 at room temperature=57.5 kp./mm.²
  At 150° C.=48.1 kp./mm.²
  After 1 hour's storage in boiling water=64.5 kp./mm.²
Compressive strength DIN 53454=38.8 kp./mm.²
Impact strength VSM 77,105=190.7 cm. kp./cm.²
Water absorption after 1 hour at 100° C.=0.53%
tg δ at various temperatures (measured with the Schering bridge; 1000 v./50 Hz.) at:

25° C.=0.009
60° C.=0.009
80° C.=0.008
100° C.=0.010
120° C.=0.016
140° C.=0.033
160° C.=0.077

EXAMPLE 4

1000 parts of crystalline triglycidylisocyanurate having an epoxide content of 9.2 epoxide equivalents/kg. are mixed with 350 parts of acetone and 139 parts of 1,3-di-(γ-aminopropyl) - 5,5 - dimethylhydantoin, dissolved in 100 parts of acetone, are added dropwise with vigorous stirring. After completion of the addition, the acetone is distilled off and the residual clear melt is further kept at 120° C. for 45 minutes. The reaction mixture is thereafter diluted with 240 parts of ethylene glycol monomethyl ether and cooled to room temperature.

A solution results which only tends to slight crystallisation after several days (=resin solution D). The undiluted reaction mixture yields a clear light yellow-coloured non-crystalline solid resin, which does not crystallise even after prolonged storage. 120 parts of the resin solution D manufactured according to the process described above and diluted with ethylene glycol monomethyl ether are mixed with a solution of 35 parts of 4,4'-diaminodiphenyl-sulphone and 0.3 part of boron trifluoride-monoethylamine complex in 100 parts of ethylene glycol monomethyl ether, whereby an impregnating solution of about 150 cp./24° C. is produced.

Prepregs are manufactured by dip impregnation and drying for 6 to 7 minutes at 150° C., as described in Example 1. The pressing to give laminates can be carried out as described in Example 1. Herein, the press bundles are introduced into the press heated to 160° C. and, following a contact time of 120–150 seconds, are pressed for one hour at 20 kp./cm.².

A tough laminate results, which after 5 hours' postcure at 160° C. shows the following properties:

Resin content=38%
Flexural strength according to VSM 77103 at room temperature=55.8 kp./mm.$^2$
At 150° C.=45.0 kp./mm.$^2$
After 1 hour's storage in boiling water=50.8 kp./mm.$^2$
Compressive strength DIN 53454=37.5 kp./mm.$^2$
Impact strength VSM 77105=227.9 cm. kp./cm.$^2$
Water absorption after 1 hour at 100° C.=0.85%
tg δ at various temperatures (measured with the Schering bridge; 1000 v./50 Hz.) at—
25°=0.009
60° C.=0.011
80° C.=0.015
100° C.=0.019
120° C.=0.032
140° C.=0.060

EXAMPLE 5

A composite material based on carbon fibres was prepared as follows:

Five hundred parts of resin solution A, prepared as described in Example 1, were mixed with a solution of 175 parts 4,4'-diaminodiphenyl sulphone and 3.5 parts of boron trifluoride-monoethylamine complex in sufficient acetone such that the total solids content of the whole was 33%.

Type II treated carbon fibre, manufactured by the Morganite Research and Development Co. Ltd., was laid cut at 3 tows per centimetre, and impregnated with the solution. An inflexible prepreg was obtained after heating the impregnated material for 15 minutes at 125° C. Seven or nine layers thus formed were stacked, one on top of the other, and pressed in a multiple mould into bars 1.27 cm. wide and 10 cm. long. These bars were pressed for 1 hour at 170° C. under a pressure of 14 kg./square cm. The bars were then post-cured for 2 hours at 180° C.

The bars prepared from 7 layers of the prepreg were pressed to a nominal thickness of 0.2 cm. They were tested for flexural strength. In the test the span:depth ratio was 16:1 and the rate was 0.6 cm./minute. The results are shown in Table A.

The bars prepared from 9 layers of the prepreg were pressed to a minimal thickness of 0.25 cm. They were sawn into pieces 1.6 cm. in length and tested for interlaminar shear strength on a three-point loading jig, the span:depth ratio being 5.7:1, and the rate 0.5 mm./minute. The results are shown in Table B.

In all cases the fibre content of the samples was calculated from the actual bar dimensions.

TABLE A

| Test temperature, ° C. | Fibre content, percent | Ultimate flexural strength (kg./mm.$^2$) | Modulus (kg./mm.$^2$) |
|---|---|---|---|
| 25 | 56 | 94 | 11,760 |
| 100 | 56 | 100 | 12,050 |
| 150 | 56 | 112 | 11,400 |
| 200 | 55 | 43 | 6,300 |

TABLE B

| Test temperature, ° C. | Fibre content, percent | Interlaminar shear strength (kg./mm.$^2$) |
|---|---|---|
| 25 | 57 | 7.85 |
| 100 | 57 | 8.42 |
| 150 | 60 | 6.94 |
| 250 | 58 | 3.59 |

We claim:
1. In a process for the manufacture of prepregs in which the prepreg substrate is impregnated with an organic solution of triglycidylisocyanurate and a curing agent, the impregnation being characterized by the tendency of the triglycidylisocyanurate to crystallize and adhere poorly to the substrate, the improvement which comprises employing, in place of the triglycidylisocyanurate,
a curable polyadduct obtained by reacting at an elevated temperature triglycidylisocyanurate with from 0.05 to 0.5 amine hydrogen equivalents per epoxide equivalent of a cycloaliphatic, aromatic or heterocyclic polyamine containing at least two primary amino groups, said curing agent being present in an amount sufficient for complete curing of the polyadduct.

2. A process as claimed in claim 1, wherein a member selected from the class consisting of glass fibres, boron fibres and carbon fibres is used as the prepreging substrate.

3. A process as claimed in claim 1, wherein polyimide fibre is used as the prepreg substrate.

4. A process as claimed in claim 1, wherein a polyadduct obtained using 4,4'-diaminodiphenylsulphone or 4,4'-diaminodiphenylmethane as the polyamine is used as the curable polyadduct.

5. A process as claimed in claim 1, wherein a polyadduct obtained using 4,4'-diamino-3,3'-dimethyldicyclohexylmethane as the polyamine is used as the curable polyadduct.

6. A process as claimed in claim 1, wherein a polyadduct obtained using 1,3-di-(γ-aminopropyl)-5,5-dimethylhydantoin as the polyamine is used as the curable polyadduct.

7. A process as claimed in claim 1, wherein an aromatic or heterocyclic di-primary polyamine is used as the curing agent).

8. A process as claimed in claim 7, wherein 4,4'-diaminodiphenyl-sulphone or 4,4'-diaminodiphenylmethane is used as the curing agent.

9. A process as claimed in claim 1, wherein a boron trifluoride-amine complex is used as the curing agent.

10. A process as claimed in claim 9, wherein borontrifluoride-monoethylamine is used as the curing agent.

11. A process as claimed in claim 1, wherein ethylene glycol monomethyl ether and/or dimethylformamide are used as the organic solvent.

References Cited
UNITED STATES PATENTS
3,454,421 7/1969 Westbrook _____ 117—126 GE
3,530,093 9/1970 Maurer _____ 260—2 N
3,483,168 12/1969 Forster et al. ____ 260—2 ECN OTHER REFERENCES
Chem. Abstracts, vol. 69, 78384X (1968).

WILLIAM D. MARTIN, Primary Examiner
D. COHEN, Assistant Examier

U.S. Cl. X.R.
117—126 GE, 138.8 A, 161 ZB; 260—2 EC, N

PO-1050
(5/69)

UNITED STATES PATENT OFFICE
CERTIFICATE OF CORRECTION

Patent No. 3,676,200        Dated July 11, 1972

Inventor(s) HEINZ REMBOLD ET AL

It is certified that error appears in the above-identified patent and that said Letters Patent are hereby corrected as shown below:

Column 8, line 28, delete "prepreging" and substitute --- prepreg ---.

Signed and sealed this 16th day of April 1974.

(SEAL)
Attest:

EDWARD M. FLETCHER, JR.        C. MARSHALL DANN
Attesting Officer        Commissioner of Patents